(12) United States Patent
Ragazzi et al.

(10) Patent No.: US 9,822,752 B2
(45) Date of Patent: Nov. 21, 2017

(54) VEHICLE HEATING SYSTEM AND METHOD

(71) Applicant: Ford Global Technologies, LLC, Dearborn, MI (US)

(72) Inventors: Franco Ragazzi, Ann Arbor, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 14/281,753

(22) Filed: May 19, 2014

(65) Prior Publication Data

US 2015/0330351 A1 Nov. 19, 2015

(51) Int. Cl.
| | | |
|---|---|---|
| *F02N 19/10* | (2010.01) | |
| *F02N 19/04* | (2010.01) | |
| *B60W 20/00* | (2016.01) | |
| *F02M 31/16* | (2006.01) | |
| *B60H 1/00* | (2006.01) | |
| *F01M 5/02* | (2006.01) | |
| *F01P 11/20* | (2006.01) | |
| *F02N 11/04* | (2006.01) | |
| *F02N 11/08* | (2006.01) | |

(52) U.S. Cl.
CPC ......... *F02N 19/10* (2013.01); *B60H 1/00314* (2013.01); *B60H 1/00921* (2013.01); *B60W 20/00* (2013.01); *F01M 5/021* (2013.01); *F02M 31/16* (2013.01); *F02N 19/04* (2013.01); *B60H 2001/00928* (2013.01); *F01P 11/20* (2013.01); *F02N 11/04* (2013.01); *F02N 11/0814* (2013.01); *F02N 2200/023* (2013.01); *F02N 2200/122* (2013.01); *Y02T 10/126* (2013.01); *Y10S 903/902* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,275,012 A | * | 1/1994 | Dage | .......... | B60H 1/00392 219/202 |
| 5,355,689 A | * | 10/1994 | Hara | .......... | B60H 1/00814 62/159 |
| 5,467,006 A | * | 11/1995 | Sims | .......... | B60H 1/00642 180/65.1 |
| 5,775,406 A | * | 7/1998 | Ghitea, Jr. | .......... | B60H 1/008 165/11.1 |
| 5,899,086 A | * | 5/1999 | Noda | .......... | B60H 1/00914 165/42 |
| 6,067,808 A | * | 5/2000 | Dage | .......... | B60H 1/3207 165/202 |

(Continued)

OTHER PUBLICATIONS

Smith, Mark G. et al., "Climate Control System," U.S. Appl. No. 14/010,057, filed Aug. 26, 2013, 14 pages.

*Primary Examiner* — Bhavesh V Amin
(74) *Attorney, Agent, or Firm* — David Kelley; McCoy Russell LLP (57) ABSTRACT

Methods and system for providing heat to a vehicle are presented. In one example, a heat pump supplies thermal energy to an engine to reduce engine emissions during engine starting. Further, heating the engine via the heat pump may also reduce engine friction at colder ambient temperatures where oil viscosity may be increased.

20 Claims, 6 Drawing Sheets

(56) References Cited

U.S. PATENT DOCUMENTS

| | | | | |
|---|---|---|---|---|
| 6,233,957 | B1* | 5/2001 | Hirao | B60H 1/3205 62/228.3 |
| 6,237,357 | B1* | 5/2001 | Hirao | B60H 1/004 62/239 |
| 6,370,903 | B1* | 4/2002 | Wlech | B60H 1/00385 165/104.12 |
| 6,418,745 | B1* | 7/2002 | Ratliff | F25B 1/02 62/235.1 |
| 6,457,542 | B1* | 10/2002 | Hosono | B60K 6/22 180/68.1 |
| 6,616,059 | B2* | 9/2003 | Sabhapathy | B60H 1/04 123/142.5 E |
| 6,629,512 | B2* | 10/2003 | Iwatani | F01M 5/021 123/142.5 R |
| 6,655,164 | B2* | 12/2003 | Rogstam | B60H 1/00907 62/196.4 |
| 6,755,046 | B2* | 6/2004 | Nishida | B60H 1/00921 62/239 |
| 7,769,505 | B2* | 8/2010 | Rask | B60K 6/24 180/65.275 |
| 8,966,928 | B2* | 3/2015 | Oomura | B60H 1/00785 62/389 |
| 9,211,778 | B2* | 12/2015 | Takahashi | B60H 1/00907 |
| 2005/0039878 | A1* | 2/2005 | Meyer | B60H 1/00878 165/42 |
| 2005/0103487 | A1* | 5/2005 | Aflekt | B60H 1/00907 165/202 |
| 2006/0053814 | A1* | 3/2006 | Naik | B60H 1/3208 62/241 |
| 2006/0219448 | A1* | 10/2006 | Grieve | B60L 11/1816 180/65.31 |
| 2007/0006571 | A1* | 1/2007 | Vetrovec | F01N 5/02 60/281 |
| 2007/0119638 | A1* | 5/2007 | Grieve | B60L 11/1881 180/65.1 |
| 2007/0193852 | A1* | 8/2007 | Ashford | C10G 7/02 196/132 |
| 2008/0034767 | A1* | 2/2008 | Ziehr | B60H 1/00385 62/180 |
| 2008/0034777 | A1* | 2/2008 | Copeland | F25B 13/00 62/323.1 |
| 2008/0085672 | A1* | 4/2008 | Creed | B60H 1/00207 454/69 |
| 2008/0275600 | A1* | 11/2008 | Rask | B60K 6/24 701/22 |
| 2009/0036047 | A1* | 2/2009 | Deneau | B60H 1/00849 454/145 |
| 2009/0071428 | A1* | 3/2009 | Kamiyama | B60H 1/00314 123/142.5 R |
| 2010/0206957 | A1* | 8/2010 | Vyas | B60H 1/00428 236/46 R |
| 2010/0293966 | A1* | 11/2010 | Yokomachi | B60H 1/00478 62/3.2 |
| 2011/0165829 | A1* | 7/2011 | Nefcy | B60H 1/00278 454/75 |
| 2011/0298241 | A1* | 12/2011 | Varns | B60H 1/00014 296/64 |
| 2012/0009859 | A1* | 1/2012 | Wijaya | B60H 1/00764 454/75 |
| 2012/0043935 | A1* | 2/2012 | Dyer | B60H 1/003 320/109 |
| 2012/0090814 | A1* | 4/2012 | Crosier | B60H 1/00028 165/59 |
| 2012/0262881 | A1* | 10/2012 | Onimaru | B60L 3/003 361/701 |
| 2013/0076124 | A1* | 3/2013 | Yagura | B60L 1/04 307/9.1 |
| 2013/0141578 | A1* | 6/2013 | Chundrlik, Jr. | H04N 7/181 348/148 |
| 2013/0211649 | A1* | 8/2013 | Tashiro | B60H 1/00735 701/22 |
| 2013/0211650 | A1* | 8/2013 | Tashiro | B60W 10/06 701/22 |

* cited by examiner

VEHICLE HEATING SYSTEM AND METHOD

FIELD

The present description relates to methods and a system for improving heating of a vehicle. The methods and system may be particularly useful for vehicles that are selectively propelled via an engine that may be stopped during vehicle operation to improve hydrocarbon fuel economy.

BACKGROUND AND SUMMARY

A hybrid vehicle may be electrically coupled to a stationary power grid when the vehicle is not being driven to supply low cost and low carbon emission fuel (e.g., electrical charge) to the vehicle. The vehicle may operate for a time using the electrical charge provided by the stationary power grid. Nevertheless, if the vehicle is driven for an extended period of time, an internal combustion engine may be started to propel the vehicle. The engine may also recharge the vehicle's battery when the battery state of charge (SOC) is low. However, vehicle emissions may be higher than desired when the engine is cold started since cold start emissions are often higher than vehicle emissions when the vehicle's engine is restarted warm.

The inventors herein have recognized the above-mentioned disadvantages and have developed a method for heating a vehicle, comprising: selectively operating a vehicle heat pump when the vehicle is electrically coupled to a stationary electrical power grid; and providing heat to an engine via the vehicle heat pump.

By heating coolant supplied to an engine via a heat pump, it may be possible to provide the technical result of reducing engine friction and engine emissions after an engine has not started for a period of time. Since the vehicle is electrically coupled to a stationary electrical power grid, electrical power generated at lower cost and lower emissions levels may provide a cost effective way of reducing vehicle emissions during engine starting. Additionally, the heat pump may be selectively operated when the vehicle is not electrically coupled to a stationary electrical power grid to warm the engine before engine starting. For example, the heat pump may be activated during regenerative braking to heat the engine so that the engine may be prepared to start at conditions that may reduce engine emissions as compared to if the engine was near ambient temperature during engine starting.

The present description may provide several advantages. For example, the approach may improve vehicle emissions. Additionally, the approach may reduce fuel consumption while maintaining passenger comfort. Further, the approach may improve a vehicle's regenerative braking capability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
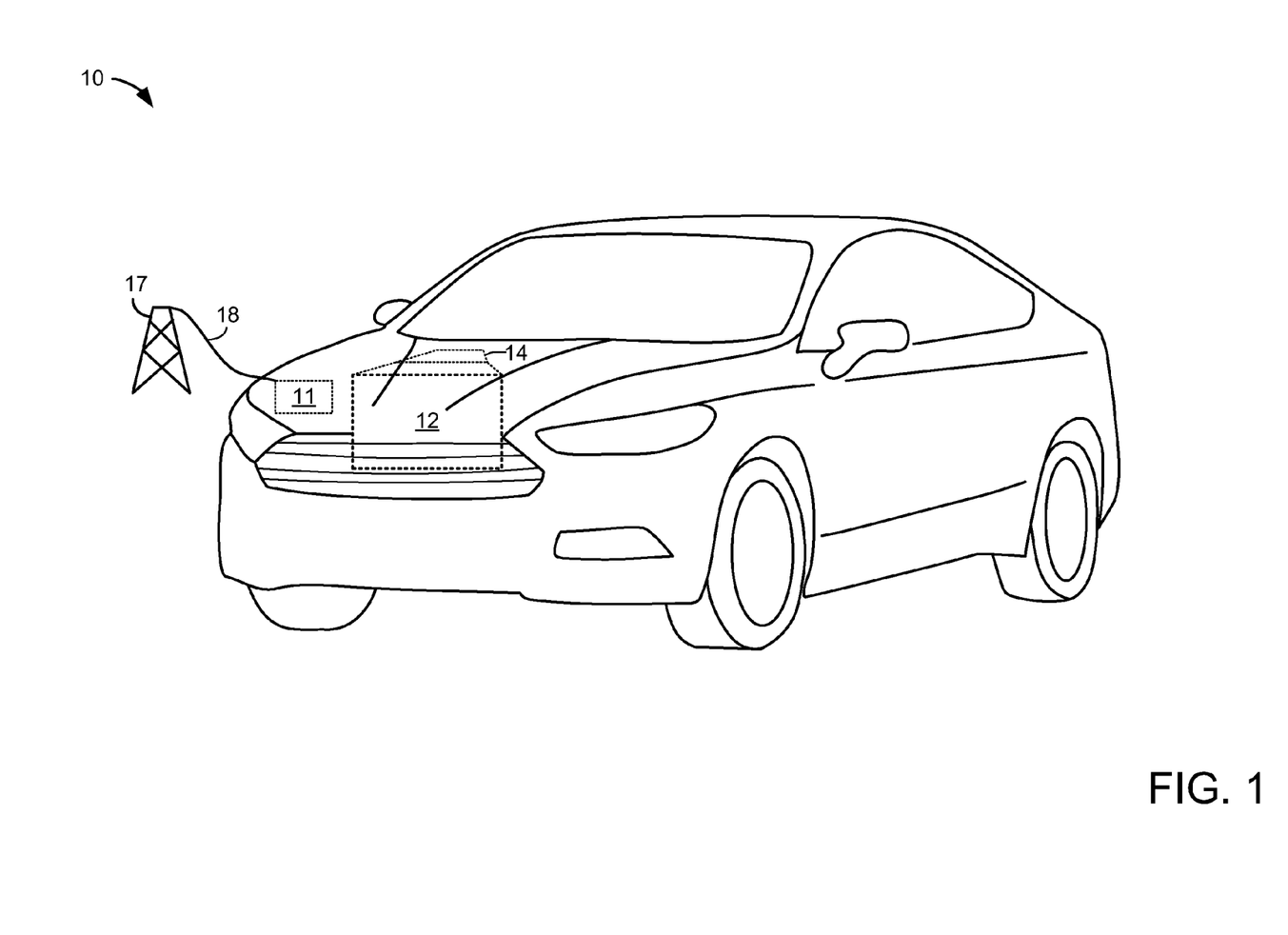
FIG. 1 is a schematic diagram of a vehicle.
Figure 2:
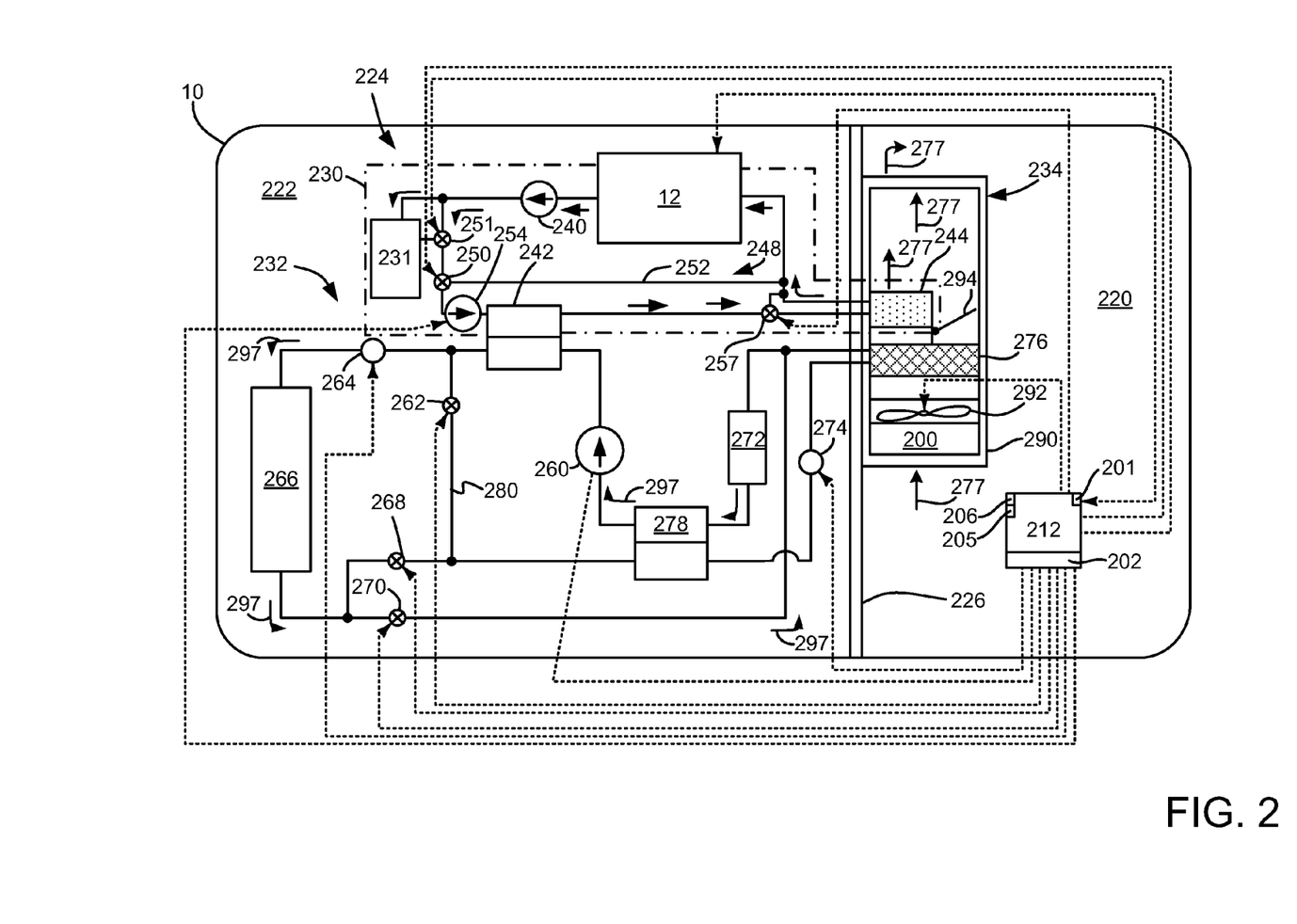
FIG. 2 shows an example vehicle heating system for the vehicle of FIG. 1.
Figure 3:
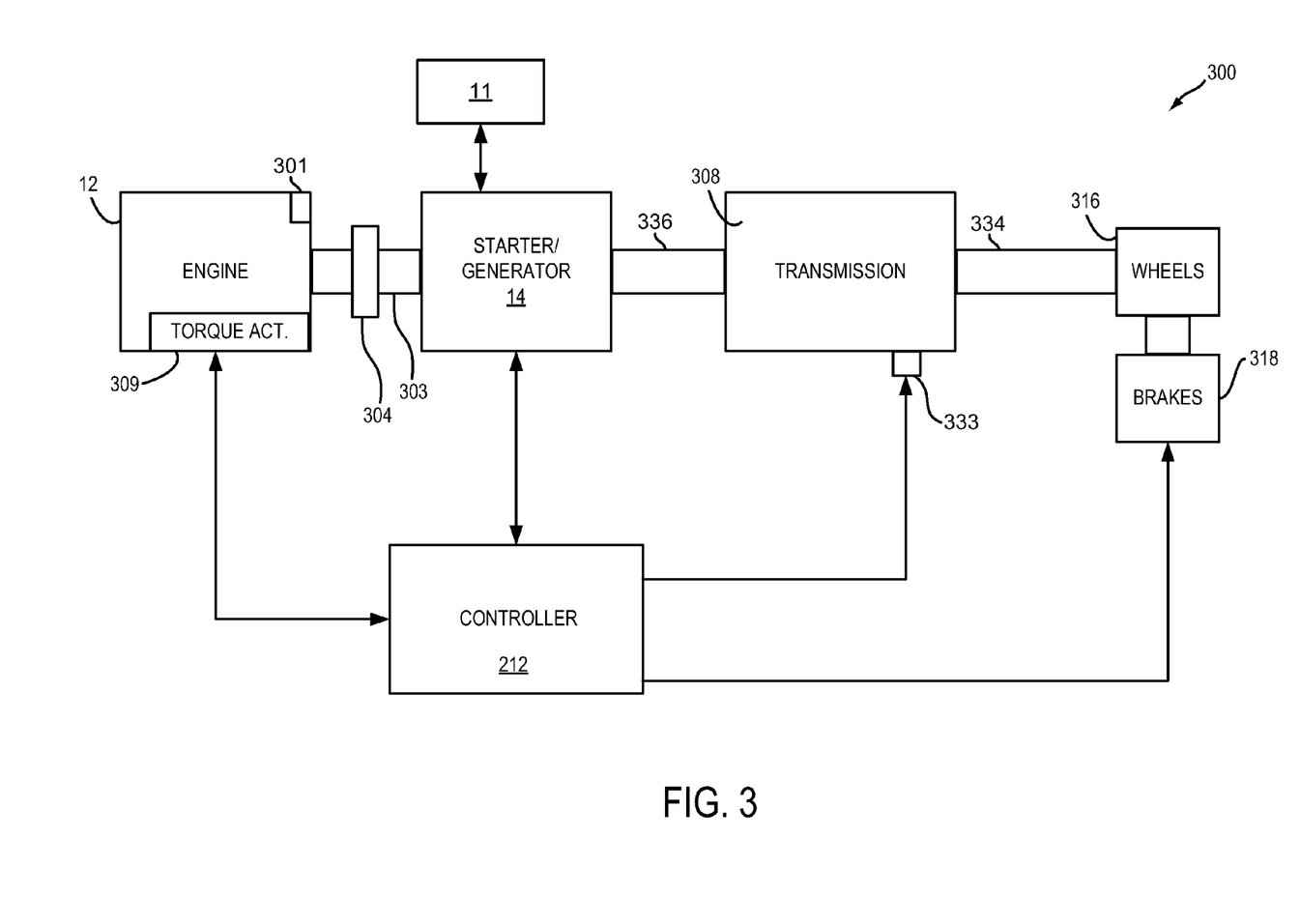
FIG. 3 shows an example vehicle driveline for the vehicle of FIG. 1.

The present description is related to providing heat to a vehicle. In particular, a vehicle's coolant loop may be heated to warm a passenger compartment and/or an engine when the engine is not operating. The vehicle may be a passenger vehicle as is shown in FIG. 1 or a commercial vehicle (not shown). The vehicle includes a climate control system as is shown in FIG. 2. The climate control system may include an engine that is part of a hybrid powertrain as is shown in FIG. 3. Heat may be provided to the vehicle based on the method of FIGS. 4 and 5. The vehicle's engine may be warmed to improve engine starting heated as shown in the operating sequence of FIG. 6.

Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine 14 may be supplied electrical power via the electrical energy storage device 11. The electrical energy storage device 11 may also be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary electrical power grid 17 via a home charging system or a remote charging system (e.g., a charging station) and electrical conductor 18. In one example, electrical energy storage device 11 is a battery. Alternatively, electrical energy storage device 11 may be a capacitor or other electric energy storage device.

Referring now to FIG. 2, a vehicle heating system or climate control system 224 is shown. Devices and fluidic passages or conduits are shown as solid lines. Electrical connections are shown as dashed lines.

The vehicle 10 may include a driveline as shown in FIG. 3 or another suitable driveline to propel the vehicle 10 and/or power vehicle components. Vehicle 10 is shown with internal combustion engine 12, and it may be selectively coupled to an electric machine (not shown). Internal combustion engine 12 may combust petrol, diesel, alcohol, hydrogen, or a combination of fuels.

The vehicle 10 may include a passenger compartment or cabin 220, an engine compartment 222, and a climate control system 224. The passenger compartment 220 may be within vehicle 10 and it may receive one or more occupants.

A portion of climate control system 224 may be positioned in passenger compartment 220.

Engine compartment 222 may be positioned proximate to passenger compartment 220. One or more power sources, such as internal combustion engine 12, as well as a portion of climate control system 224 may be within engine compartment 222. Engine compartment 222 may be isolated from the passenger compartment 220 via bulkhead 226. The climate control system 224 may circulate air and/or control or modify the temperature of air that is circulated in the passenger compartment 220. Further, the internal combustion engine 12 may be heated via climate control system 224 to reduce fuel consumption and emissions. The climate control system 224 may include a coolant subsystem 230, a heat pump subsystem 232, and a ventilation subsystem 234.

The coolant subsystem 230, which may also be referred to as a coolant loop, may circulate a coolant, such as glycol, to cool the internal combustion engine 12. For example, waste heat that is generated by the internal combustion engine 12 when the engine is running or operational may be transferred to the coolant and then circulated to radiator 231 to cool internal combustion engine 12. In at least one example, the coolant subsystem 230 may include a coolant pump 240, an intermediate heat exchanger 242, a heater core 244, and a bypass loop 248 that may be fluidly interconnected by conduits or passages such as tubes, hoses, pipes, or the like. The coolant subsystem 230 includes radiator 231 for transferring thermal energy to the ambient air surrounding the vehicle 10. Coolant subsystem 230 also includes electrically operated valves 250 and 251 for adjusting coolant flow through engine 12, radiator 231, and intermediate heat exchanger 242. Electrically operated valves 250 and 251 are selectively operated via controller 212. In a first position, three-way valve 257 allows coolant to flow from intermediate heat exchanger 242 to engine 12 without entering heater core 244. In a second position, three-way valve 257 allows coolant to flow intermediate heat exchanger 242 to heater core 244 and on to engine 12. The position of three-way valve 257 may be adjusted to divert an increasing portion of the heat produced by heat pump subsystem 232 to the engine.

The coolant pump 240 may circulate coolant through the coolant subsystem 230. The coolant pump 240 may be powered by an electrical or non-electrical power source. For example, the coolant pump 240 may be operatively coupled to an internal combustion engine 12 via a belt, or alternatively may be driven by an electrically powered motor. The coolant pump 240 may receive coolant from the internal combustion engine 12 and circulate the coolant in a closed loop. For example, when the climate control system 224 is in a heating mode, coolant may be routed from the coolant pump 240 to the intermediate heat exchanger 242, bypassing radiator 231, and then to the heater core 244 before returning to the internal combustion engine 12 as represented by the arrowed lines. Coolant may take the same path when heat pump subsystem 232 is providing heat to engine 12 before engine 12 is started or rotating to improve vehicle emissions. When internal combustion engine 12 is outputting a higher level of thermal energy, coolant may flow from pump 240 to radiator 231 before returning to internal combustion engine 12 via intermediate heat exchanger 242 and heater core 244. Electrically operated valve 251 directs coolant from pump 240 through radiator 231 or around radiator 231 and to electrically operated valve 250. Coolant may flow through or around engine 12 based on the position of electrically actuated valve 250.

The intermediate heat exchanger 242 may facilitate the transfer of thermal energy between the coolant subsystem 230 and the heat pump subsystem 232. In particular, heat may be transferred from heat pump subsystem 232 to coolant subsystem 230. The intermediate heat exchanger 242 may be part of the coolant subsystem 230 and the heat pump subsystem 232. The intermediate heat exchanger 242 may have any suitable configuration. For example, the intermediate heat exchanger 242 may have a plate-fin, tube-fin, or tube-and-shell configuration that may facilitate the transfer of thermal energy from heat pump subsystem 232 to coolant subsystem 230 without mixing or exchanging the heat transfer fluids in the coolant subsystem 230 and heat pump subsystems 232. Heat may be transferred from the heat pump subsystem 232 to the coolant via the intermediate heat exchanger 242 when the climate control system 224 is in a heating mode.

The heater core 244 may transfer thermal energy from the coolant to air in the passenger compartment 220. The heater core 244 may be positioned in the passenger compartment 220 in the ventilation subsystem 234 and may have any suitable configuration. For example, the heater core 244 may have a plate-fin or tube-fin construction in one or more examples.

The bypass loop 248 may route coolant such that the coolant is not heated by the internal combustion engine 12. A bypass loop control valve 250 may control the flow of coolant through the bypass loop 248. More specifically, the bypass loop control valve 250 may permit coolant to flow through a bypass line 252 and inhibit the flow of coolant from internal combustion engine 12 to the intermediate heat exchanger 242 when in a first position. In such a position, a second coolant pump 254 may circulate coolant through the bypass loop 248 from the intermediate heat exchanger 242 to the heater core 244 to the bypass line 252 and back to the second coolant pump 254. As such, the coolant in the coolant subsystem 230 may be heated independently by the heat pump subsystem 232 via the intermediate heat exchanger 242. The bypass loop control valve 250 may also inhibit the flow of coolant through the bypass line 252 when in a second position. The second coolant pump 254 may or may not circulate coolant when coolant does not flow through the bypass line 252.

The heat pump subsystem 232 may transfer thermal energy to or from the passenger compartment 220 and to or from the coolant subsystem 230. In at least one example, the heat pump subsystem 232 may be configured as a vapor compression heat pump subsystem in which a fluid is circulated through the heat pump subsystem 232 to transfer thermal energy to or from the passenger compartment 220.

The heat pump subsystem 232 may operate in various modes, including, but not limited to a cooling mode, heating mode, de-icing mode, parallel dehumidification mode, and serial dehumidification mode. In the cooling mode, the heat pump subsystem 232 may circulate a heat transfer fluid, which may be called a refrigerant, to transfer thermal energy from inside the passenger compartment 220 to outside the passenger compartment 220. In a heating mode, the heat pump subsystem 232 may transfer thermal energy from the refrigerant to the coolant via the intermediate heat exchanger 242 without circulating the refrigerant through a heat exchanger in the passenger compartment 220. Additionally, in heating mode, the heat pump subsystem 232 may provide thermal energy solely to the engine 12 or solely to the heater core 244, or to both engine 12 and heater core 244. In de-icing mode, warmed refrigerant may be supplied to exterior heat exchanger 266 to reduce icing at exterior heat exchanger 266. During parallel and serial dehumidification modes, humidity may be removed from passenger compartment or cabin 220 via interior heat exchanger 276.

In heating mode, heat pump subsystem 232 may include a pump 260, a first control valve 262, a first expansion device 264, an exterior heat exchanger 266, a second control valve 268, a third control valve 270, an accumulator 272, a second expansion device 274, an interior heat exchanger 276, and an optional internal heat exchanger 278. Components of the heat pump subsystem 232 may be in fluidic communication via one or more conduits, such as a tube, hose or the like. In FIG. 2, the refrigerant circulation path when in the heating mode is represented by the arrowed lines 297. Valves 262 and 268 are closed during heating mode.

The pump 260, which may also be called a compressor, may pressurize and circulate the refrigerant through the heat pump subsystem 232. The pump 260 may be powered by an electrical or non-electrical power source. For example, the pump 260 may be operatively coupled to internal combustion engine 12 or driven by an electrically powered motor. In a heating mode, the pump 260 may provide high pressure refrigerant to the intermediate heat exchanger 242, which in turn may transfer heat from the high pressure refrigerant to coolant passing through the intermediate heat exchanger 242 to heat coolant flowing in coolant subsystem 230.

The first control valve 262 may be positioned along a bypass path 280 that may be positioned between the intermediate heat exchanger 242 and the first expansion device 264. The bypass path 280 may permit some refrigerant to bypass the first expansion device 264 and the exterior heat exchanger 266 and flow to the internal heat exchanger 278 (if provided), the second expansion device 274, and the interior heat exchanger 276 when the first control valve 262 is open. The first control valve 262 may be closed to inhibit the flow of refrigerant through the bypass path 280 to the interior heat exchanger 276 when in heating mode.

The first expansion device 264 may be positioned between and may be in fluidic communication with intermediate heat exchanger 242 and the exterior heat exchanger 266. The first expansion device 264 may be provided to change the pressure of the refrigerant. For example, the first expansion device 264 may be a thermal expansion valve (TXV) or a fixed or variable position valve that may or may not be externally controlled. The first expansion device 264 may reduce the pressure of the refrigerant that passes through the first expansion device 264 from the intermediate heat exchanger 242 to the exterior heat exchanger 266. Therefore, high pressure refrigerant received from the intermediate heat exchanger 242 may exit the first expansion device 264 at a lower pressure and as a liquid and vapor mixture in the heating mode.

The exterior heat exchanger 266 may be positioned outside the passenger compartment 220. In a cooling mode or air conditioning context, the exterior heat exchanger 266 may function as a condenser and may transfer heat to the surrounding environment to condense the refrigerant from a vapor to a liquid. However, intermediate heat exchanger 242 may operate as the condenser when heat pump subsystem 232 is in cooling mode while engine 12 is being warmed to reduce engine emissions and engine friction. In a heating mode, the exterior heat exchanger 266 may function as an evaporator and may transfer heat from the surrounding environment to the refrigerant, thereby causing the refrigerant to vaporize.

The second control valve 268 may be positioned between the exterior heat exchanger 266 and the bypass path 280. The second control valve 268 may be a check valve and it may inhibit the flow of refrigerant from the bypass path 280 to the exterior heat exchanger 266. As such, refrigerant exiting the exterior heat exchanger 266 when the climate control system 224 is in the heating mode may be routed to the third control valve 270.

A third control valve 270 may be positioned between the exterior heat exchanger 266 and the accumulator 272. The third control valve 270 may help control the flow of refrigerant that exits the exterior heat exchanger 266. In the heating mode, the third control valve 270 may be open to permit refrigerant to flow from the exterior heat exchanger 266 to the accumulator 272. The third control valve 270 may be closed and the second expansion device 274 may be opened in other modes, such as a cooling mode.

The accumulator 272 may act as a reservoir for storing any residual liquid refrigerant so that vapor refrigerant rather than liquid refrigerant may be provided to the pump 260. The accumulator 272 may include a desiccant that absorbs small amounts of water moisture from the refrigerant.

The second expansion device 274 may be positioned between and may be in fluidic communication to the exterior heat exchanger 266 and the interior heat exchanger 276. The second expansion device 274 may have a similar structure as the first expansion device 264 and may be provided to change the pressure of the refrigerant similar to the first expansion device 264. In addition, the second expansion device 274 may be closed to inhibit the flow of refrigerant. More specifically, the second expansion device 274 may be closed to inhibit the flow of refrigerant from the exterior heat exchanger 266 to the interior heat exchanger 276 in the heating mode. As such, closing the second expansion device 274 may inhibit the flow of refrigerant through the second control valve 268 to the internal heat exchanger 278 (if provided), as well as through the interior heat exchanger 276.

The interior heat exchanger 276 may be fluidly connected to the second expansion device 274. The interior heat exchanger 276 may be positioned inside the passenger compartment 220. In a cooling mode or air conditioning context, the interior heat exchanger 276 may function as an evaporator and may receive heat from air in the passenger compartment 220 to vaporize the refrigerant. Refrigerant exiting the interior heat exchanger 276 may be routed to the accumulator 272. In the heating mode, refrigerant may not be routed to the interior heat exchanger 276 due to the closure of the second expansion device 274.

The internal heat exchanger 278, if provided, may transfer thermal energy between refrigerant flowing through different regions of the heat pump subsystem 232. The internal heat exchanger 278 may be positioned outside the passenger compartment 220. In a cooling mode or air conditioning context, heat may be transferred from refrigerant that is routed from the exterior heat exchanger 266 to the interior heat exchanger 276 to refrigerant that is routed from the accumulator 272 to the pump 260. In the heating mode, the internal heat exchanger 278 does not transfer thermal energy between such refrigerant flow paths since the second expansion device 274 is closed, thereby inhibiting the flow of refrigerant through a portion of the internal heat exchanger 278.

The ventilation subsystem 234 may circulate air in the passenger compartment 220 of the vehicle 10. The ventilation subsystem 234 may have a housing 290, a blower 292, and a temperature door 294.

The housing 290 may receive components of the ventilation subsystem 234. In FIG. 2, the housing 290 is illustrated such that internal components are visible rather than hidden for clarity. In addition, airflow through the housing 290 and internal components is represented by the arrowed lines 277. The housing 290 may be at least partially positioned in the passenger compartment 220. For example, the housing 290 or a portion thereof may be positioned under an instrument panel of the vehicle 10. The housing 290 may have an air intake portion 200 that may receive air from outside the vehicle 10 and/or air from inside the passenger compartment 220. For example, the air intake portion 200 may receive ambient air from outside the vehicle 10 via an intake passage, duct, or opening that may be located in any suitable location, such as proximate a cowl, wheel well, or other vehicle body panel. The air intake portion 200 may also receive air only from or more than a predetermined amount (e.g., 75%) from inside the passenger compartment 220 and recirculate such air through the ventilation subsystem 234 (e.g. recirculation mode). One or more doors or louvers may be provided to permit or inhibit air recirculation.

The blower 292 may be positioned in the housing 290. The blower 292, which may also be called a blower fan, may be positioned near the air intake portion 200 and may be configured as a centrifugal fan that may circulate air through the ventilation subsystem 234.

The temperature door 294 may be positioned between the interior heat exchanger 276 and the heater core 244. In the example shown, the temperature door 294 is positioned downstream of the interior heat exchanger 276 and upstream of the heater core 244. The temperature door 294 may block or permit airflow through the heater core 244 to help control the temperature of air in the passenger compartment 220. For example, the temperature door 294 may permit airflow through the heater core 244 in the heating mode such that heat may be transferred from the coolant to air passing through the heater core 244. This heated air may then be provided to a plenum for distribution to ducts and vents or outlets located in the passenger compartment 220. The temperature door 294 may be moved between a plurality of positions to provide air having a desired temperature. In FIG. 2, the temperature door 294 is shown in a full heat position in which airflow is directed through the heater core 244.

Figure 4:
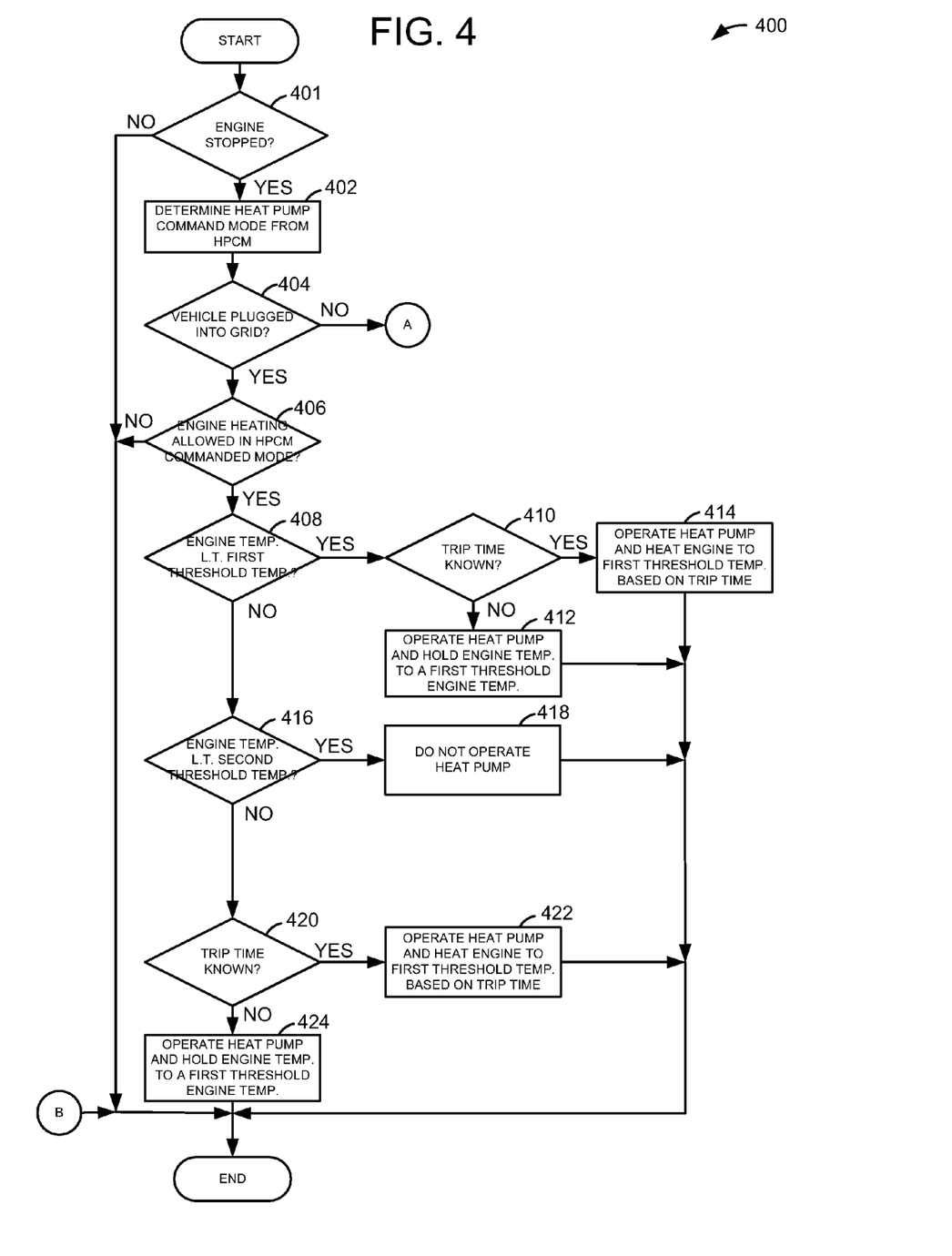
FIGS. 4 and 5 shows a method for operating a heating system.
Figure 5:
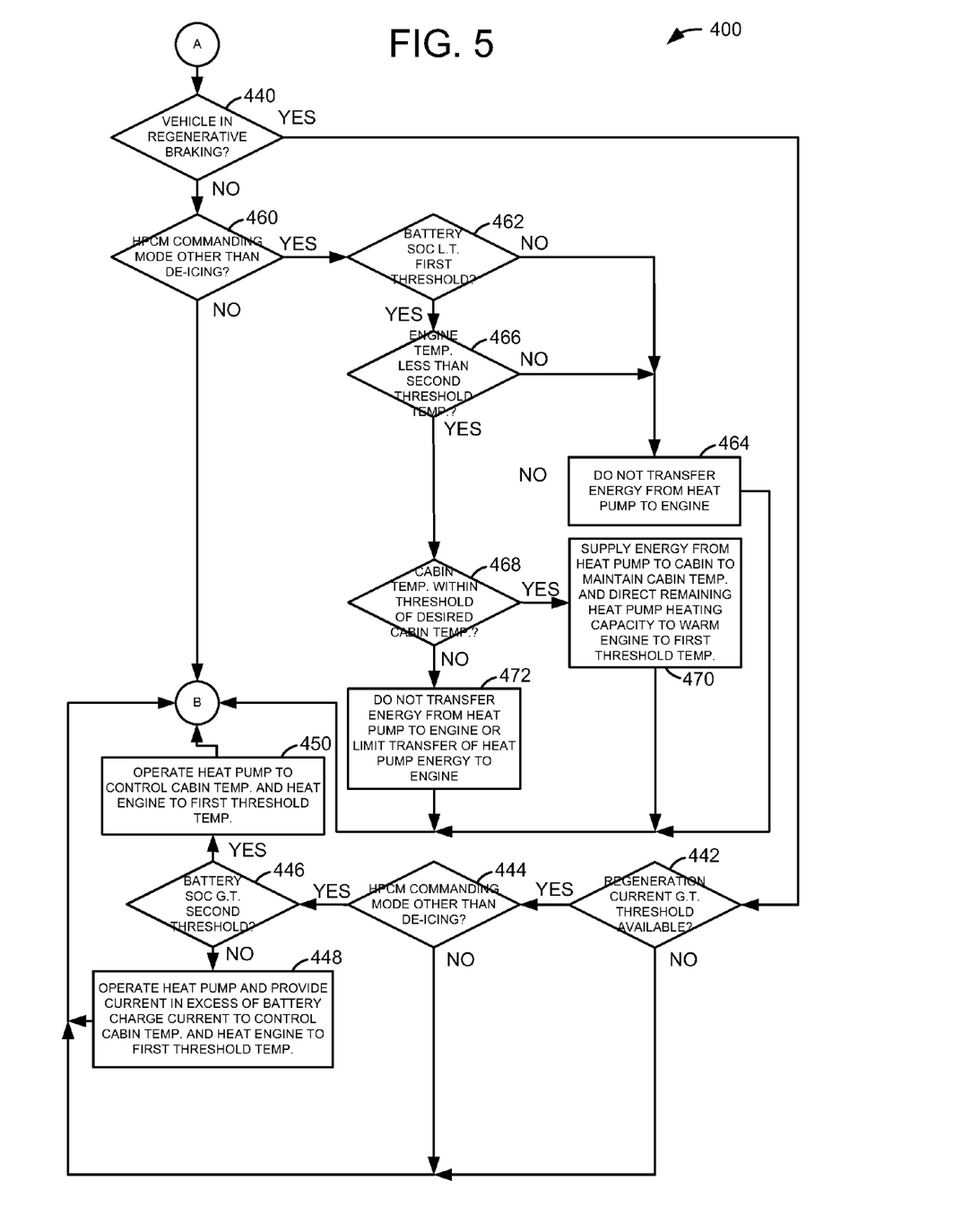

Controller 212 includes executable instructions of the method in FIGS. 4 and 5 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 4.

The system of FIG. 2 may also be operated in a de-ice mode. During de-ice mode first expansion device 264 may be adjusted (e.g., fully opened) so that a small pressure drop occurs across first expansion device 264. Further, second expansion device 274 is closed so that refrigerant does not pass through interior heat exchanger 276. Compressor 260 increases temperature of refrigerant as it compresses the refrigerant. The heated refrigerant is directed through exterior heat exchanger 266, thereby warming exterior heat exchanger 266 to de-ice coils. The heated refrigerant is returned to compressor 260 after the refrigerant flows through accumulator 272 and internal heat exchanger 278.

The system of FIG. 2 may also be operated in a series passenger cabin dehumidification mode. During series passenger cabin dehumidification mode, first expansion device 264 is opened to allow refrigerant to flow to external heat exchanger 266, which acts as an evaporator, and first control valve 262 is closed to prevent refrigerant from flowing from intermediate refrigerant and to coolant heat exchanger 242 to interior heat exchanger 278. The compressed refrigerant passes through external heat exchanger 266 and check valve 268 before reaching second expansion device 274. Second expansion device 274 is adjusted to provide a small pressure drop, thereby limiting the cooling of interior heat exchanger 276. By providing only a small pressure drop across second expansion device 274, moisture in passenger cabin 220 may be condensed without substantially cooling the cabin air. Refrigerant leaves second expansion device 274 to enter interior heat exchanger 276. The refrigerant is returned to compressor 260 from heat exchanger 276 after it passes through pressure regulator 280 and accumulator 272.

The system of FIG. 2 may also be operated in a parallel passenger cabin dehumidification mode. During parallel passenger cabin dehumidification mode, first control valve 262, and second control valve 270 are opened to allow refrigerant to flow through external heat exchanger 266 and bypass 280. Further, the first expansion device 264 is open and it regulates refrigerant flow into the external heat exchanger 266. Refrigerant output from external heat exchanger 266 is directed to accumulator 272. Refrigerant passing through bypass passage 280 is directed through second expansion device 274 and interior heat exchanger 276. Operating the heat pump subsystem 232 in a parallel dehumidification mode allows cabin dehumidification at lower ambient air temperatures. The refrigerant pressure in the external heat exchanger 266 is allowed to drop without causing very low refrigerant pressures in the interior heat exchanger 276, thereby decreasing the risk of ice forming on the coils of internal heat exchanger 276.

Referring now to FIG. 3, a block diagram of a vehicle driveline 300 in vehicle 10 is shown. Driveline 300 may be powered by engine 12. Engine 12 may be started with an engine starting system including starter 301 or via electric machine or driveline integrated starter generator (DISG) 14. Further, engine 12 may generate or adjust torque via torque actuator 309, such as a fuel injector, throttle, camshaft, etc.

An engine output torque may be transmitted to driveline disconnect clutch 304. Driveline disconnect clutch selectively couples and decouples driveline 300. Driveline disconnect clutch 304 may be electrically or hydraulically actuated. The downstream side of driveline disconnect clutch 304 is shown mechanically coupled to DISG input shaft 303.

DISG 14 may be operated to provide torque to driveline 300 or to convert driveline torque into electrical energy to be stored in electric energy storage device 11. DISG 14 has a power output that is greater than starter 301. Further, DISG 14 directly drives driveline 300 or is directly driven by driveline 300. There are no belts, gears, or chains to couple DISG 14 to driveline 300. Rather, DISG 14 rotates at the same rate as driveline 300 and may be mechanically coupled to transmission 308 via shaft 336. Electrical energy storage device 11 may be a battery, capacitor, or inductor. The downstream side of DISG 14 is mechanically coupled to transmission 308.

Automatic transmission 333 includes gear clutches (e.g., gears 1-6) for adjusting a transmission gear ratio. The gear clutches 333 may be selectively engaged to propel vehicle 10. Torque output from the automatic transmission 308 may in turn be relayed to wheels 316 to propel the vehicle via output shaft 334. Output shaft 334 delivers torque from transmission 308 to wheels 316. Automatic transmission 308 may transfer an input driving torque to the wheels 316.

Further, a frictional force may be applied to wheels 316 by engaging wheel friction brakes 318. In one example, wheel friction brakes 318 may be engaged in response to the driver pressing his foot on a brake pedal (not shown). In other examples, controller 212 or a controller linked to controller 212 may apply engage wheel friction brakes. In the same way, a frictional force may be reduced to wheels 316 by disengaging wheel friction brakes 318 in response to the driver releasing his foot from a brake pedal. Further, vehicle brakes may apply a frictional force to wheels 316 via controller 212 as part of an automated engine stopping procedure.

Controller 212 may be programmed to receive inputs from engine 12 and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine torque output by controlling a combination of fuel pulse width, fuel pulse timing, and air charge. In all cases, engine control may be performed on a cylinder-by-cylinder basis to control the engine torque output. Controller 212 may also control torque output and electrical energy production from DISG by adjusting current flowing to and from DISG windings as is known in the art. Controller 212 may also include non-transitory memory for storing executable instructions of the method described in FIGS. 4 and 5.

When idle-stop conditions are satisfied, controller 212 may initiate engine shutdown by shutting off fuel and spark to the engine. However, the engine may continue to rotate in some examples. Conversely, when restart conditions are satisfied, and/or a vehicle operator wants to launch the vehicle, controller 212 may reactivate the engine by resuming combustion in cylinders. The engine may be started via rotating the engine via DISG 14 or starter 301.

Thus, the system of FIGS. 1-3 provides for a vehicle system, comprising: an engine; a heat pump including a heat exchanger providing thermal communication between the engine and the heat pump; and a controller including executable instructions stored in non-transitory memory for activating the heat pump and supplying thermal energy from the heat pump to the engine in response to a vehicle being in a regenerative braking mode. The vehicle system further comprises an electric motor and additional instructions for supplying current from the electric motor to the heat pump in response to regenerative current being greater than a threshold current.

In some examples, the vehicle system further comprises additional instructions for supplying current from the electric motor to the heat pump in response to battery state of charge being greater than a threshold. The vehicle system further comprises additional instructions for supplying heat to a passenger cabin via the heat pump. The vehicle system further comprises a battery and additional instructions for activating the heat pump in response to current in excess of a battery charge current provided by the electric motor. The vehicle system further comprises additional instructions for supplying electric current to the heat pump in response to a battery state of charge being less than a threshold and in response to the vehicle not being in the regenerative braking mode.

Referring now to FIGS. 4 and 5, a method for providing heat to a vehicle is shown. The method of FIGS. 4 and 5 may be stored in non-transitory memory of a controller, such as controller 212 of FIG. 2. The method of FIGS. 4 and 5 may also provide the simulated operating sequence shown in FIG. 6. The method of FIGS. 4 and 5 may be performed solely when an engine is not started.

At 401, method 400 judges if the engine is stopped. The engine may be judged stopped if engine position is not changing. If the engine is stopped, the answer is yes and method 400 proceeds to 402. Otherwise, the answer is no and method 400 exits.

At 402, method 400 determines a desired heat pump operating mode from a heat pump control module (HPCM). The heat pump control module may be software in controller 212 or a controller external to controller 212 that broadcasts the heat pump operating mode to other subsystems. The heat pump operating mode may be off, cooling mode, heating mode, parallel dehumidification, series dehumidification, or de-icing mode. The HPCM may select the heat pump mode based on user inputs, ambient temperature and/or humidity, passenger cabin temperature and/or humidity. Method 400 proceeds to 404 after the desired heat pump operating mode is determined.

At 404, method 400 judges if the vehicle is plugged into a stationary electrical power grid. The electrical power grid may supply power to a home, business, or kiosk. In one example, method 400 judges if the vehicle is electrically coupled to a stationary power grid based on voltage sensed at a vehicle electrical receptacle. In other examples, method 400 may judge that the vehicle is electrically coupled to the stationary electrical power grid via a switch that is applied when an electrical cable is connected to the vehicle. If method 400 judges that the vehicle is in electrical communication with the stationary power grid, the answer is yes and method 400 proceeds to 406. Otherwise, the answer is no and method 400 proceeds to 440.

At 406, method 400 judges if engine heating is allowed in the presently selected heat pump mode as determined from the HPCM. Engine heating may be available in heat pump heating mode, parallel dehumidification mode, series dehumidification mode, cooling mode, and when the HPCM commands the heat pump off. Engine heating is not available when the HPCM is commanding de-icing mode. Note that the heat pump may be activated to provide engine heating even when the HPCM commands the heat pump off. If the HPCM selected heat pump operating mode provides for engine heating, the answer is yes and method 400 proceeds to 408. Otherwise, method 400 proceeds to exit.

At 408, method 400 judges if engine temperature is less than (L.T.) a first threshold temperature. Alternatively, or in addition, method 400 may judge if ambient temperature is less than the first threshold temperature. Engine and ambient temperatures may be determined via temperature sensors or inferred. In one example, the first threshold temperature may be a lower operating limit of the vehicle's heat pump or an engine temperature where engine emissions are greater than a threshold engine emissions level. If method 400 judges that engine and/or ambient temperature is less than the first threshold temperature, the answer is yes and method 400 proceeds to 416. Otherwise, the answer is no and method 400 proceeds to 410.

At 410, method 400 judges whether or not a trip time (e.g., a departure time) of a scheduled trip is known. The trip may be scheduled via an operator interface, the internet, or via other device. The trip details may include but are not limited to departure time, travel distance, destination, and travel route. The departure time may be a basis for determining a time to activate the vehicle's heat pump to heat the engine if conditions are present for heating the engine. If method 400 knows or determines the trip time, the answer is yes and method 400 proceeds to 414. Otherwise, the answer is no and method 400 proceeds to 412.

At 414, method 400 operates the vehicle's heat pump in an effort to heat the engine, unless the HPCM has selected the heat pump to be in de-icing mode. The heat pump is activated in an effort to heat the engine to a first threshold engine temperature based on the trip time. For example, the heat pump may be activated 10 minutes before the scheduled trip time to allow the engine to reach the first threshold temperature. In one example, the number of minutes the heat pump is activated before the trip time is determined via indexing tables storing empirically determined heat pump starting times. The heat pump starting times are based on ambient temperature and engine temperature. The heat pump starting time is subtracted from the trip time to determine the time to activate the heat pump. For example, if the heat pump starting time is 10 minutes and the vehicle is scheduled to leave at 6:10 A.M., the heat pump is activated at 6:00 A.M. so that the engine is warm at vehicle departure time.

The heat pump is operated in a mode requested by the HPCM. However, if the HPCM is requesting the heat pump off, the heat pump is operated in a heating mode except valve 257 directs all coolant flow from intermediate heat exchanger 242 to engine 12, thereby bypassing heater core 244. Additionally, valve 251 is adjusted so that coolant flows from engine 12 to valve 250, and valve 250 is adjusted to allow coolant to flow to pump 254. Pump 254 is also activated to warm engine 12.

If the HPCM is requesting de-icing, the engine is not heated via the heat pump. However, the engine may be heated after de-icing mode is exited.

If the HPCM is requesting cooling mode, intermediate heat exchanger 242 operates as a condenser and the position of valve 257 is adjusted to route coolant from intermediate heat exchanger 242 to engine 12 without passing through heater core 244. In one example, expansion valve 264 may be closed and valve 262 may be opened to allow intermediate heat exchanger 242 to operate as a condenser. In a second example, expansion valve 264 remains closed and valve 262 is open until compressor head pressure (e.g., compressor outlet pressure) reaches a threshold pressure, then expansion valve 264 is opened and valve 262 is closed. Additionally, valve 251 is adjusted so that coolant flows from engine 12 to valve 250, and valve 250 is adjusted to allow coolant to flow to pump 254. Pump 254 is also activated to warm engine 12.

If the HPCM is requesting heating mode, intermediate heat exchanger 242 operates as a condenser and the position of valve 257 is modulated between two operating states to provide as much heat to the engine as possible while a higher heating priority is provided to achieve a desired heater core inlet coolant temperature. For example, the position of three-way valve 257 may be varied between the second position, which allows heat transfer from intermediate heat exchanger 242 to heater core 244, and a first position, which allows heat transfer from intermediate heat exchanger 242 to engine 12 bypassing heater core 244. If the heater core inlet temperature is below a desired value, valve 257 remains in the second position. As heater core inlet temperature reaches the desired heater core inlet coolant temperature, the valve 257 may be moved from the second to the first position so that additional heat is transferred to the engine. In this way, passenger cabin heating is given priority over engine heating. The heat pump compressor speed is adjusted based on heater core inlet coolant temperature.

Compressor output is increased if heater core inlet coolant temperature is less than desired, and compressor output is decreased if heater core inlet coolant temperature is greater than desired. When modulating valve 257, thermal energy is transferred to the engine and compressor output is adjusted (e.g., increased) to maintain heater core inlet coolant temperature. If heat pump compressor output is at its rated output, valve 257 stops directing additional coolant flow to engine 12. Thus, valve 257 may be opened until compressor 260 reaches its output capacity. Additionally, valve 251 is adjusted so that coolant flows from engine 12 to valve 250, and valve 250 is adjusted to allow coolant to flow to pump 254. Pump 254 is also activated to warm engine 12. In this way, passenger cabin heating is given priority over engine heating.

If the HPCM is requesting parallel or series dehumidification, intermediate heat exchanger 242 operates as a condenser and the position of valve 257 is modulated between two operating states to provide as much heat to the engine as possible while a higher heating priority is provided to achieve a desired heater core inlet coolant temperature. For example, the position of three-way valve 257 may be varied between the second position, which allows heat transfer from intermediate heat exchanger 242 to heater core 244, and a first position, which allows heat transfer from intermediate heat exchanger 242 to engine 12 bypassing heater core 244. If the heater core coolant inlet temperature is below a desired target value, valve 257 remains in the second position. As heater core inlet temperature reaches the desired heater core inlet temperature, the valve 257 may be moved from the second towards the first position so that additional heat is transferred to the engine. In this way, passenger cabin dehumidification is given priority over engine heating. The heat pump compressor speed is adjusted based on heater core inlet coolant temperature.

Compressor output is increased if heater core inlet coolant temperature is less than desired, and compressor output is decreased if heater core inlet coolant temperature is greater than desired. When modulating valve 257, thermal energy is transferred to the engine and compressor output is adjusted to maintain heater core inlet coolant temperature. If heat pump compressor output is at its rated output, valve 257 stops directing additional coolant flow to engine 12. Thus, valve 257 may be opened until compressor 260 reaches its output capacity. Additionally, valve 251 is adjusted so that coolant flows from engine 12 to valve 250, and valve 250 is adjusted to allow coolant to flow to pump 254. Pump 254 is also activated to warm engine 12. In this way, passenger cabin dehumidification is given priority over engine heating.

Additionally, method 400 may attempt to maintain engine temperature at the first threshold temperature for a predetermined amount of time (e.g., 10 minutes) after the scheduled departure time if the vehicle does not depart. The first threshold temperature the engine is heated to is an engine temperature where engine emissions are less than a threshold engine emissions level when the engine is started. Also, the passenger cabin may be heated to a desired temperature. Method 400 proceeds to exit after the heat pump is operated according to the HPCM and engine heating requirements.

At 412, method 400 operates the heat pump in an effort to hold or maintain engine temperature at the first threshold engine temperature after the vehicle is electrically coupled to the stationary electrical grid, unless the heat pump is operating in de-icing mode. Further, the heat pump is operated in the mode requested by the HPCM at 402. For example, if the vehicle's engine is warm and the vehicle is electrically coupled to the stationary power grid, method 400 does not operate the heat pump with engine heating activated until the engine and/or ambient temperature is reduced to or reaches the first threshold temperature. However, the heat pump may be operated in the mode requested by the HPCM. The first threshold temperature may be a temperature as is described at 414. Method 400 proceeds to exit after the engine temperature is maintained.

At 416, method 400 judges if engine temperature is less than (L.T.) a second threshold temperature. Alternatively, or in addition, method 400 may judge if ambient temperature is less than the second threshold temperature. In one example, the second threshold temperature may be a temperature where engine emissions may be low. Alternatively, the second threshold temperature may be a temperature that may be reduced to a temperature less than a desired engine starting temperature if the vehicle is driven for a time while only operating the electric machine. If method 400 judges that engine and/or ambient temperature is less than the second threshold temperature, the answer is yes and method 400 proceeds to 418. Otherwise, the answer is no and method 400 proceeds to 420.

At 418, method 400 does not operate the vehicle heat pump to provide engine heating, but the heat pump may be activated to supply the desired HPCM mode determined at 402. The vehicle battery may also be charged via the stationary power grid. Method 400 proceeds to exit after the heat pump is not activated.

At 420, method 400 judges whether or not a trip time (e.g., a departure time) of a scheduled trip is known. The trip may be scheduled as is described at 410. If method 400 knows or determines the trip time, the answer is yes and method 400 proceeds to 422. Otherwise, the answer is no and method 400 proceeds to 424.

At 422, method 400 operates the vehicle's heat pump and may begin to heat the engine depending on the operating mode determined by the HPCM. The heat pump is activated in an effort to heat the engine to a first threshold temperature based on the trip time. The engine may be heated to the first threshold temperature based on trip time and the HPCM determined operating mode as is described at 414. Additionally, method 400 may maintain engine temperature at the first threshold temperature for a predetermined amount of time after the scheduled departure time if the vehicle does not depart. The first threshold temperature the engine is heated to is an engine temperature where engine emissions are less than a threshold engine emissions level when the engine is started. Method 400 proceeds to exit after the heat pump is activated.

At 424, method 400 operates the heat pump to hold or maintain engine temperature at the first threshold temperature after the vehicle is electrically coupled to the stationary electrical grid. For example, the vehicle may be electrically coupled to the stationary power grid and method 400 does not operate the heat pump to increase engine temperature until the engine and/or ambient temperature reaches the first threshold temperature. However, the heat pump may be operated in the mode determined by the HPCM. The first threshold temperature may be a temperature as is described at 414. Method 400 proceeds to exit after the engine temperature is maintained.

At 440, method 400 judges if the vehicle is in a regenerative braking mode. In one example, method 400 judges that the vehicle is in the regenerative braking mode when the electric motor or machine is operated as a generator and is supplying current to the energy storage device or other vehicle devices. If method 400 judges that the vehicle is in a regenerative braking mode, the answer is yes and method 400 proceeds to 442. Otherwise, the answer is no and method 400 proceeds to 460.

At 442, method 400 judges if regenerative current provided by the electric machine is greater than (G.T.) a threshold current, or alternatively, if the electric machine has the capacity to provide more than a threshold amount of current while operating in the regeneration mode. In one example, method 400 judges if the electric machine has capacity to provide more than the threshold amount of current based on vehicle speed and requested vehicle deceleration rate. If method 400 judges that the electric machine has the capacity to provide more than a threshold amount of current or that regenerative current provided by the electric machine is greater than a threshold current, the answer is yes and method 400 proceeds to 444. Otherwise, the answer is no and method 400 proceeds to exit.

At 444, method 400 judges if the HPCM is commanding the heat pump to a mode other than de-icing For example, if the HPCM is requesting cooling mode, heating mode, parallel dehumidification mode, series dehumidification, or off the answer is yes. If the HPCM is requesting an operating mode other than de-icing mode, the answer is yes and method 400 proceeds to 446. Otherwise, the answer is no and method 400 proceeds to exit without heating the engine via the heat pump.

At 446, method 400 judges if battery state of charge is greater than a second threshold. Battery state of charge may be estimated from battery voltage or via coulomb counting. If method 400 judges that battery state of charge is greater than a second threshold, the answer is yes and method 400 proceeds to 450. Otherwise, the answer is no and method 400 proceeds to 448.

At 450, method 400 operates the heat pump in the mode requested by the HPCM and provides engine heating and cabin climate control, if the requested heat pump operating mode is other than off. However, if the HPCM is requesting the heat pump off, the heat pump is operated in a heating mode except valve 257 directs all coolant flow from intermediate heat exchanger 242 to engine 12, thereby bypassing heater core 244. Additionally, valve 251 is adjusted so that coolant flows from engine 12 to valve 250, and valve 250 is adjusted to allow coolant to flow to pump 254. Pump 254 is also activated to warm engine 12.

If the HPCM is requesting cooling mode, intermediate heat exchanger 242 operates as a condenser and the position of valve 257 is adjusted to route coolant from intermediate heat exchanger 242 to engine 12 without passing through heater core 244. In one example, expansion valve 264 may be closed and valve 262 may be opened to allow intermediate heat exchanger 242 to operate as a condenser. In a second example, expansion valve 264 remains closed and valve 262 is open until compressor head pressure (e.g., compressor outlet pressure) reaches a threshold pressure, then expansion valve 264 is opened and valve 262 is closed. Additionally, valve 251 is adjusted so that coolant flows from engine 12 to valve 250, and valve 250 is adjusted to allow coolant to flow to pump 254. Pump 254 is also activated to warm engine 12.

If the HPCM is requesting heating mode, intermediate heat exchanger 242 operates as a condenser and the position of valve 257 is modulated between two operating states to provide as much heat to the engine as possible while a higher heating priority is provided to achieve a desired heater core inlet coolant temperature. For example, the position of three-way valve 257 may be varied between the second position, which allows heat transfer from intermediate heat exchanger 242 to heater core 244, and a first position, which allows heat transfer from intermediate heat exchanger 242 to engine 12 bypassing heater core 244. If the heater core coolant inlet temperature is below a desired value, valve 257 remains in the second position. As heater core inlet temperature reaches the desired heater core inlet temperature, the valve 257 may be moved from the second position towards the first position so that additional heat is transferred to the engine. In this way, passenger cabin heating is given priority over engine heating. The heat pump compressor speed is adjusted based on heater core inlet coolant temperature.

Compressor output is increased if heater core inlet coolant temperature is less than desired, and compressor output is decreased if heater core inlet coolant temperature is greater than desired. When modulating valve 257, thermal energy is transferred to the engine and compressor output is adjusted (e.g., increased) to maintain heater core inlet coolant temperature. If heat pump compressor output is at its rated output, valve 257 stops directing additional coolant flow to engine 12. Thus, valve 257 may be opened until compressor 260 reaches its output capacity. Additionally, valve 251 is adjusted so that coolant flows from engine 12 to valve 250, and valve 250 is adjusted to allow coolant to flow to pump 254. Pump 254 is also activated to warm engine 12. In this way, passenger cabin heating is given priority over engine heating.

If the HPCM is requesting parallel or series dehumidification, intermediate heat exchanger 242 operates as a condenser and the position of valve 257 is modulated between two operating states to provide as much heat to the engine while providing the desired heater core inlet coolant temperature. For example, the position of three-way valve 257 may be varied between the second position, which allows heat transfer from intermediate heat exchanger 242 to heater core 244, and a first position, which allows heat transfer from intermediate heat exchanger 242 to engine 12 bypassing heater core 244. If the heater core coolant inlet temperature is below a desired target value, valve 257 remains in the second position. As heater core inlet temperature reaches the desired heater core inlet temperature, the valve 257 may be moved from the second towards the first position so that additional heat is transferred to the engine. In this way, passenger cabin dehumidification is given priority over engine heating. The heat pump compressor speed is adjusted based on heater core inlet coolant temperature.

Compressor output is increased if heater core inlet coolant temperature is less than desired, and compressor output is decreased if heater core inlet coolant temperature is greater than desired. When modulating valve 257, thermal energy is transferred to the engine and compressor output is adjusted to maintain heater core inlet coolant temperature. If heat pump compressor output is at its rated output, valve 257 stops directing additional coolant flow to engine 12. Thus, valve 257 may be opened until compressor 260 reaches its output capacity. Additionally, valve 251 is adjusted so that coolant flows from engine 12 to valve 250, and valve 250 is adjusted to allow coolant to flow to pump 254. Pump 254 is also activated to warm engine 12. In this way, passenger cabin dehumidification is given priority over engine heating.

Since the battery state of charge is greater than the second threshold, regenerative braking energy may be directed to the heat pump without supplying additional electrical charge to the battery. Method 400 proceeds to exit after the heat pump is operated to provide heat to the engine.

At 448, method 400 operates the heat pump in the HPCM selected mode determined at 402 while heating the engine with regeneration current in excess of current to charge the battery. For example, if the electric machine has capacity to provide 50 amperes and the battery accepts 25 amperes at present conditions, 25 amperes may be supplied to operate the heat pump to provide engine heating and the operating mode selected by the HPCM. The heat pump controls passenger cabin temperature and uses additional regenerative braking current to heat the engine to a first threshold engine temperature as described at 450. However, if there is insufficient regenerative current to provide the heat pump operating mode and engine heating, only the heat pump operating mode is provided. Method 400 proceeds to exit after the operating the heat pump to heat the engine with excess regenerative braking current.

At 460, method 400 judges if the HPCM is commanding the heat pump to a mode other than de-icing. If the HPCM is requesting an operating mode other than de-icing mode, the answer is yes and method 400 proceeds to 462. Otherwise, the answer is no and method 400 proceeds to exit without heating the engine via the heat pump.

At 462, method 400 judges if battery state of charge is less than a first threshold. The first threshold SOC is based on an amount of charge it takes to restart the engine and an amount of charge it takes for the heat pump to heat the engine to a desired temperature (e.g., first threshold engine temperature). For example, if it is determined that energy storage device should not be less than 20% of the energy storage device storage capacity and it takes 1% of the energy storage device's capacity to warm and restart the engine at present conditions, the first threshold SOC may be 21% of the energy storage device's charge capacity. If method 400 judges that battery state of charge is less than a first threshold, the answer is yes and method 400 proceeds to 466. Otherwise, the answer is no and method 400 proceeds to 464.

At 466, method 400 judges if engine temperature and/or ambient temperature is less than a second threshold temperature. If method 400 judges that engine temperature and/or ambient temperature is less than a second threshold temperature, the answer is yes and method 400 proceeds to 468. Otherwise, the answer is no and method 400 proceeds to 464.

At 464, method 400 does not supply thermal energy to the engine from the heat pump. However, the heat pump is operated in the mode commanded by the HPCM at 402. If the heat pump is activated in heating mode, coolant flow to the engine is bypassed via adjusting valve 250 to allow coolant flow from bypass passage 252 to pump 254. Coolant does not pass through bypass passage 252 or pump 254 from engine 12 when valve 250 is adjusted to such position. Additionally, valve 257 is commanded to not allow direct coolant flow between intermediate heat exchanger 242 and engine 12. Method 400 proceeds to exit after thermal energy is not transferred from the heat pump to the engine.

At 468, method 400 judges if the passenger cabin is within a threshold temperature (e.g., ±1° C.) of a desired passenger cabin temperature (e.g., 18° C.). If so, the answer is yes and method 400 proceeds to 470. Otherwise, the answer is no and method 400 proceeds to 472.

At 470, method 400 operates the heat pump to maintain desired passenger cabin conditions, and the remaining thermal energy from the heat pump is directed to the engine to heat the engine to a first threshold engine temperature. In particular, the heat pump is operated in the HPCM commanded mode while thermal energy is supplied to the engine as is described at 450. Thus, coolant flow may not bypass the engine even though the engine is not started. Rather, warmed coolant flows to the engine to warm the engine to the first engine threshold temperature. In particular, the engine is heated as is described at 450.

However, if the heat pump being commanded in a cooling mode and engine temperature is not increasing as is desired because only a small amount of heat is being extracted from the passenger cabin, the heat pump may be temporarily transitioned to series dehumidification mode where heat can be absorbed by the refrigerant from both the ambient air and the vehicle cabin. The passenger cabin climate control may be adjusted into recirculation mode where cabin air is not mixed with outside fresh air or cabin air may be mixed with a lower amount of outside fresh air. In this way, the engine may be heated to a desired temperature with little impact to the passenger cabin temperature. Method 400 proceeds to exit after thermal energy is supplied to the engine via the heat pump.

At 472, method 400 does not transfer thermal energy from the heat pump to the engine. As discussed at 450, valve 257 may be modulated between operating states or held in a state to adjust the amount of engine heating provided by the heat pump. Additionally, valves 250 and 251 may be positioned such that heat from heat pump 232 does not heat engine 12. Consequently, the full thermal energy output by the heat pump may be directed to the passenger cabin to provide passenger comfort. Method 400 proceeds to exit after heat pump thermal energy is not transferred to engine 12.

Thus, battery SOC is a basis for anticipating engine starting, and thermal energy may be transferred from the heat pump to the engine based on SOC to that the engine may output lower emissions when the engine is restarted to increase battery or energy storage device SOC. Further, method 400 reduces electrical energy consumption by not transferring thermal energy from the heat pump to the engine during conditions where the engine temperature and/or ambient temperature would not provide desired reductions in engine emissions and/or fuel consumption.

In this way, battery SOC may be one basis for anticipating engine activation since the engine may be activated in response to a low SOC. For example, if SOC is decreasing and less than the first SOC threshold, it may be judged that the engine will be started shortly. Consequently, the heat pump may be activated in anticipation of engine starting so that the engine may be warm by the time SOC is at a level where the engine is automatically restarted to provide charge to the battery via the electric machine converting engine torque into electrical energy.

Thus, the method of FIGS. 4 and 5 provides for heating a vehicle, comprising: selectively operating a vehicle heat pump when the vehicle is electrically coupled to a stationary electrical power grid; and providing heat to an engine via the vehicle heat pump. The method includes where providing the heat is in response to an engine temperature less than a first threshold temperature. The method further comprises not providing heat to the engine in response to engine temperature being greater than a second threshold temperature. The method includes where selectively operating the vehicle heat pump includes not operating the vehicle heat pump until a predetermined time before a predetermined trip time. The method includes where the predetermined time is based on ambient temperature and engine temperature. The method also includes where providing heat to the engine includes adjusting engine temperature to a desired temperature. The method further comprises providing heat to a passenger cabin of the vehicle based on the predetermined trip time.

The method of FIGS. 4 and 5 also provides for heating a vehicle, comprising: selectively operating a vehicle heat pump when an engine of the vehicle is stopped; and providing heat to an engine via the vehicle heat pump in response to anticipated starting of the engine. The method includes where the anticipated starting of the engine is based on a state of battery charge. The method includes where an electric machine propels the vehicle when the engine is stopped. The method includes where providing heat to the engine includes increasing engine temperature to a threshold temperature and holding the engine at the threshold temperature. The method further comprises not providing heat to the engine via the vehicle heat pump in response to a temperature of a passenger cabin not being within a threshold temperature of a desired passenger cabin temperature. The method further comprises providing heat to a passenger cabin via the vehicle heat pump. The method further comprises not providing heat to the engine via the heat pump when engine temperature is greater than a threshold temperature.

Figure 6:
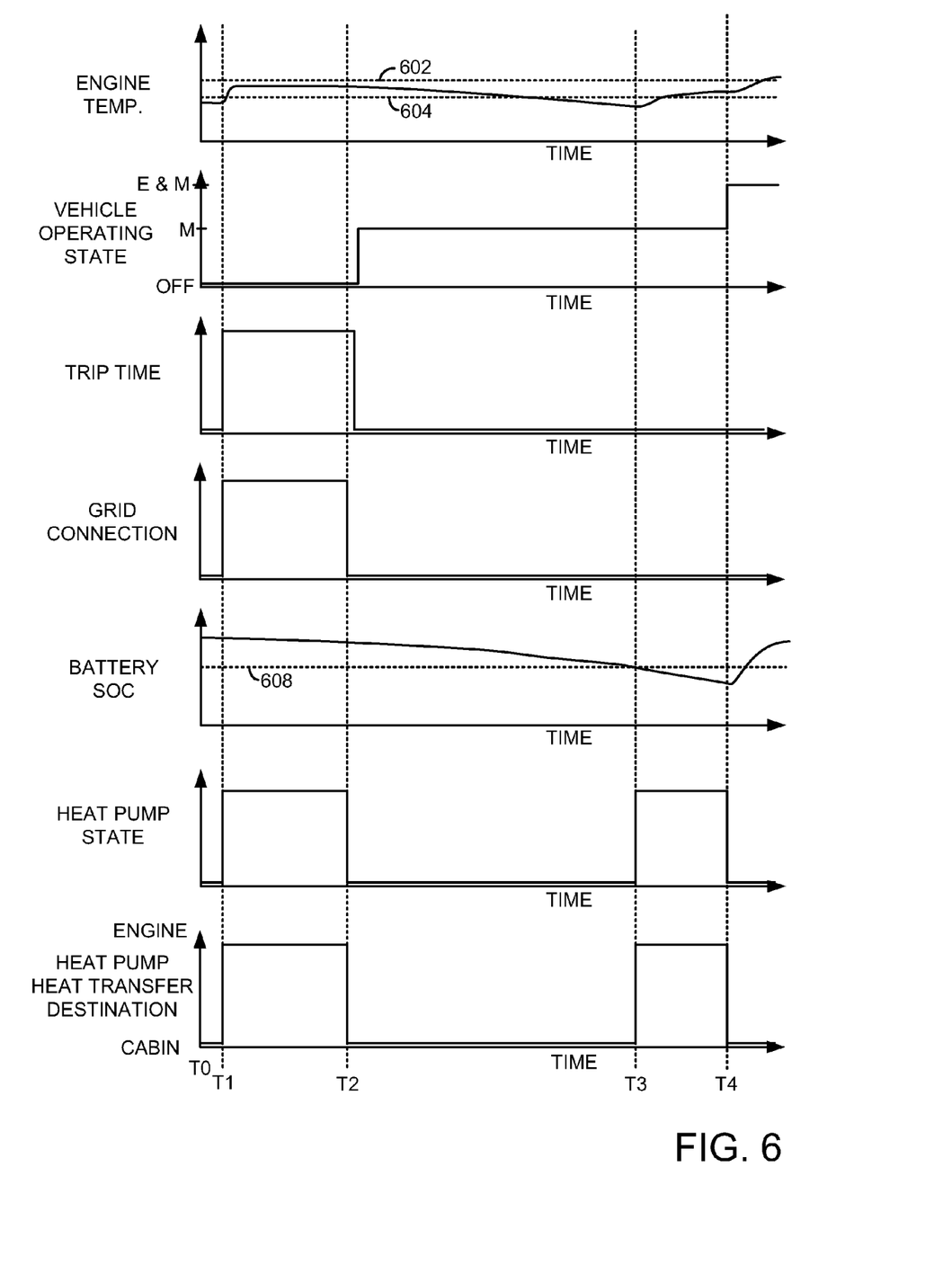
FIG. 6 shows a simulated example sequence for operating a vehicle heating system according to the method of FIGS. 4 and 5.

Referring now to FIG. 6, a simulated sequence for operating a vehicle heating system according to the method of FIGS. 4 and 5 is shown. The sequence may be performed by a system such as the system shown in FIGS. 1-3. Vertical markers T0-T4 represent times of interest in the sequence. Timings of all plots are aligned together.

The first plot from the top of FIG. 6 is a plot of engine temperature versus time. The Y axis represents engine temperature and engine temperature increases in the direction of the Y axis arrow. The X axis represents time and time increases in the direction of the X axis arrow. Horizontal line 602 represents a second threshold engine temperature which provides an upper limit of a temperature range for heating an engine via a heat pump. Horizontal line 604 represents a first threshold engine temperature which provides a lower limit of a temperature range for heating the engine via the heat pump. Thus, before the engine is started, it may be desirable to heat the engine to a temperature between 602 and 604 so that engine emissions and friction may be reduced during engine starting.

The second plot from the top of FIG. 6 is a plot of vehicle operating state versus time. The vehicle operating states are OFF; engine only and engine with motor (E & M), and motor only (M). The state OFF is where the engine and motor are not operating. The state E & M is a state where only the engine may operate or where the engine and motor may operate. The state M is a state where only the motor operates. The OFF state is active when the vehicle operating state trace is near the X axis. The M state is active when the vehicle operating state trace is near the level indicated M on the Y axis. The E & M state is active when the vehicle operating state trace is near the level indicated E & M on the Y axis.

The third plot from the top of FIG. 6 is a plot of a variable trip time versus time. Trip time is a variable that is at a high logic level (e.g., one) from a time a vehicle is not operating until a scheduled vehicle departure time is reached. In one example, the vehicle's scheduled departure may be provided via a driver, automatically, or an internet based schedule. The Y axis represents the level of the trip time variable. The X axis represents time and time increases from the left side of the plot to the right side of the plot.

The fourth plot from the top of FIG. 6 is a plot of grid connection versus time. The Y axis represents a variable representing grid connection. The X axis represents time and time increases from the left side of the plot to the right side of the plot. The grid connection variable is at a higher level when the vehicle is electrically coupled to a stationary electrical power grid. The grid connection variable is at a lower level when the vehicle is not electrically coupled to the stationary electrical power grid.

The fifth plot from the top of FIG. 6 is a plot of battery SOC versus time. The Y axis represents battery SOC and SOC increases in the direction of the Y axis arrow. The X axis represents time and time increases from the left side of the plot to the right side of the plot. Horizontal line 608 represents a threshold SOC that is a basis for anticipating engine starting since the engine may be started to increase SOC. In particular, the engine may be started when SOC is less than level 608.

The sixth plot from the top of FIG. 6 is a plot of heat pump state versus time. The Y axis indicates heat pump state and the heat pump is operating when the heat pump state is at a higher level. The heat pump is not operating when the heat pump state is at a lower level. The X axis represents time and time increases from the left side of the plot to the right side of the plot.

The seventh plot from the top of FIG. 6 is a plot of the heat pump heat transfer destination versus time. In this example, heat may be transferred from the heat pump to the engine or the passenger cabin. The Y axis represents the heat pump heat transfer destination and the heat transfer destination is the engine when the trace is at a higher level. The heat pump heat transfer destination is the passenger cabin when the trace is at a lower level. The X axis represents time and time increases from the left side of the plot to the right side of the plot.

At time T0, the engine temperature is less than threshold 604 and the vehicle is not electrically coupled to a stationary electrical power grid. The engine and motor are not operating as indicated by the vehicle operating state and the trip time is at a lower level indicating that a trip is not pending. The battery SOC is at a higher level and the heat pump is not active. Also, the heat pump heat transfer destination is the passenger cabin, but heat is not transferred to the passenger cabin since the heat pump state is low (e.g., not active). Such conditions may be indicative of a time when the vehicle is stopped but not electrically coupled to a stationary electrical power grid.

At time T1, the heat pump is activated in response to the engine temperature being less than level 604. Further, one or more valves (e.g., 257 of FIG. 2) may be adjusted to route coolant from an intermediate heat exchanger to the engine as indicated by the heat pump heat transfer destination switching from passenger cabin to engine. The engine temperature begins to increase as thermal energy is transferred from the heat pump to the engine. Variables of the other plots remain substantially unchanged.

At time T2, a driver uncouples the vehicle from the stationary electrical power grid as indicated by the grid connection trace transitioning to a lower level. The heat pump state transitions to a lower level to indicate that the heat pump is deactivated in response to engine temperature being greater than threshold 604 and the vehicle being uncoupled from the electrical grid. The heat pump heat transfer destination also switches from engine to passenger cabin in response to the vehicle being uncoupled from the stationary electrical grid. A short time thereafter, the trip time variable transitions to a lower level to indicate that the departure time has arrived. The trip time variable may change state in response to the arrival time being achieved or in response to the vehicle being electrically decoupled from the stationary electrical power grid. The vehicle operating state variable transitions to a higher level to indicate that the vehicle is operating in motor only mode where the electrical machine is the sole source of vehicle propulsion. The engine temperature remains between level 602 and level 604.

Between time T2 and time T3, the engine temperature is reduced to a level less than 604. Thus, in this example, activating the heat pump while the vehicle was connected to the stationary electrical power grid did not allow the engine to remain warm until the engine was restarted. However, in other examples where ambient temperature is higher, the engine may remain warm without operating the heat pump until a time when the engine is restarted. Notice that the heat pump is not started and heat is not transferred from the heat pump to the engine because the battery SOC is higher than level 608.

At time T3, the battery SOC is reduced to less than level 608. Level 608 may represent a SOC level above a SOC where the engine is scheduled to automatically restart. And, because SOC is known to be decreasing, level 608 is a level indicating an impending engine start. The heat pump is activated in response to SOC being less than level 608 and engine temperature being less than level 604. Further, the heat pump heat transfer destination is switched from cabin to engine in response to SOC being less than level 608. Activating the heat pump increases engine temperature. The vehicle operating state, trip time, and grid connection variables remain unchanged.

At time T4, the engine is restarted as indicated by the vehicle operating state transitioning to a higher level. The heat pump is deactivated and the heat pump heat transfer destination is switched to passenger cabin in response to starting the engine. Battery SOC and engine temperature increase as the engine provides torque to the electric machine, thereby generating electrical power. The vehicle operating state, trip time, and grid connection variables remain unchanged.

In this way, a heat pump may be operated when a vehicle is electrically coupled to a stationary electrical power grid while the engine is stopped to improve engine emissions. Further, the heat pump may be activated in anticipation of engine operation to warm the engine when the engine temperature is less than a threshold temperature.

As will be appreciated by one of ordinary skill in the art, methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for heating a vehicle, comprising:
   selectively operating a vehicle vapor compression heat pump system of the vehicle when the vehicle is electrically coupled to a stationary electrical power grid; and
   via activating at least the vehicle vapor compression heat pump system, transferring heat from a passenger cabin to a refrigerant in a heat pump system via an interior heat exchanger, transferring heat from the refrigerant to glycol coolant in a coolant system via an intermediate heat exchanger, and transferring heat from the glycol coolant to an engine in response to the vehicle being electrically coupled to the stationary electrical power grid.

2. The method of claim 1, further comprising activating the vehicle vapor compression heat pump system in response to an amount of time to heat the engine to a threshold temperature, the amount of time based on ambient temperature and engine temperature, and not providing the heat until an engine temperature is less than a first threshold temperature, where the vehicle vapor compression heat pump system provides the heat via compressing the refrigerant and transferring heat from the refrigerant to engine coolant in the coolant system, and where the refrigerant is expanded via an expansion valve in the heat pump system, and wherein a pump pumps the glycol coolant while the vapor compression heat pump system is activated.

3. The method of claim 2, further comprising not providing heat to the engine in response to engine temperature being greater than a second threshold temperature, and where the heat pump system includes an evaporator and a condenser.

4. The method of claim 1, where selectively operating the vehicle vapor compression heat pump system includes not operating the vehicle vapor compression heat pump system until a predetermined time before a predetermined trip departure time, and further comprising flowing the glycol coolant through the engine and bypassing glycol coolant flow around a radiator in the coolant system which transfers thermal energy to air surrounding the vehicle via a valve while heating the engine via the vehicle vapor compression heat pump system.

5. The method of claim 4, where the predetermined time is based on ambient temperature and engine temperature.

6. The method of claim 4, where transferring heat from the glycol coolant to the engine includes adjusting engine temperature to a desired temperature, and further comprising anticipating engine starting based on battery state of charge, and starting the vehicle vapor compression heat pump system before the engine is started based on the anticipated engine starting.

7. The method of claim 1, further comprising determining a desired heat pump system operating mode via a heat pump system control module in the vehicle in response to the vehicle being electrically coupled to the stationary electrical power grid, and
   responsive to the heat pump system being commanded in a cooling mode and engine temperature not increasing as is desired because only a small amount of heat is being extracted from the passenger cabin, transitioning the heat pump system temporarily to a series dehumidification mode where heat is absorbed by refrigerant from both ambient air and the passenger cabin, and where a passenger cabin ventilation system is adjusted into a recirculation mode where cabin air is not mixed with outside fresh air.

8. A method for heating a vehicle, comprising:
   selectively operating a heat pump system of the vehicle via activating a compressor of the heat pump system when an engine of the vehicle is stopped; and
   via activating at least the vehicle heat pump system, transferring heat from a passenger cabin to refrigerant in the heat pump system via an interior heat exchanger, transferring heat from the refrigerant to glycol coolant in a coolant system via an intermediate heat exchanger, and transferring heat from the glycol coolant to the engine in response to anticipated starting of the engine based on battery state of charge, and starting the vehicle heat pump system before the engine is started based on the anticipated engine starting.

9. The method of claim 8, wherein transferring heat from the passenger cabin to the refrigerant cools the passenger cabin, and wherein transferring heat from the passenger cabin is in response to the vehicle being electrically coupled to a stationary electrical power grid.

10. The method of claim 8, where an electric machine propels the vehicle when the engine is stopped, and where the heat pump system is a vapor compression heat pump system, and further comprising flowing the glycol coolant through the engine and bypassing glycol coolant flow around a radiator in the coolant system which transfers thermal energy to air surrounding the vehicle via a valve while heating the engine via the vapor compression heat pump system.

11. The method of claim 8, where transferring heat from the glycol coolant to the engine includes increasing engine temperature to a threshold temperature and holding the engine at the threshold temperature, and responsive to the heat pump system being commanded in a cooling mode and engine temperature not increasing as is desired because only a small amount of heat is being extracted from the passenger cabin, transitioning the heat pump system temporarily to a series dehumidification mode.

12. The method of claim 8, further comprising not providing heat to the engine via the heat pump system in response to a temperature of a passenger cabin not being within a threshold temperature of a desired passenger cabin temperature.

13. The method of claim 8, further comprising heating the passenger cabin to a desired temperature via the vehicle heat pump system when the engine of the vehicle is stopped.

14. The method of claim 8, further comprising not providing heat to the engine via the vehicle heat pump system when engine temperature is greater than a threshold temperature.

15. A vehicle system, comprising:
   an engine;
   a climate control system with a coolant subsystem, a heat pump subsystem, and a ventilation subsystem, the coolant subsystem including a heater core and a radiator, the coolant subsystem and the heat pump subsystem including an intermediate heat exchanger providing thermal communication between the heat pump subsystem and the coolant subsystem, the radiator separate from the intermediate heat exchanger; and
   a controller including executable instructions stored in non-transitory memory for supplying thermal energy via the intermediate heat exchanger to engine coolant via operating the heat pump subsystem in a cooling mode and to transition to a series dehumidification mode in response to a temperature of the engine, and further to supply the thermal energy by operating the intermediate heat exchanger as a condenser while bypassing the heater core.

16. The vehicle system of claim 15, further comprising an electric motor and additional instructions for supplying current from the electric motor to the heat pump subsystem in response to a regenerative current being greater than a current accepted by a battery to charge the battery.

17. The vehicle system of claim 16, further comprising additional instructions for supplying current from the electric motor to the heat pump subsystem in response to a battery state of charge being greater than a threshold.

18. The vehicle system of claim 15, further comprising additional instructions for adjusting the climate control system into a recirculation mode in response to the temperature of the engine, where in the recirculation mode, an air intake of a passenger compartment climate control system receives more than a predetermined amount of air from inside a passenger compartment.

19. The vehicle system of claim 16, further comprising the battery and instructions for activating the heat pump subsystem in response to current in excess of a battery charge current provided by the electric motor.

20. The vehicle system of claim 19, further comprising additional instructions for supplying electric current to the heat pump subsystem in response to a battery state of charge being less than a threshold and in response to the vehicle not being in a regenerative braking mode.

* * * * *